D. C. SLATER.
VARIABLE SPEED TRANSMISSION MECHANISM.
APPLICATION FILED SEPT. 9, 1920.
1,383,159.
Patented June 28, 1921.
3 SHEETS—SHEET 1.
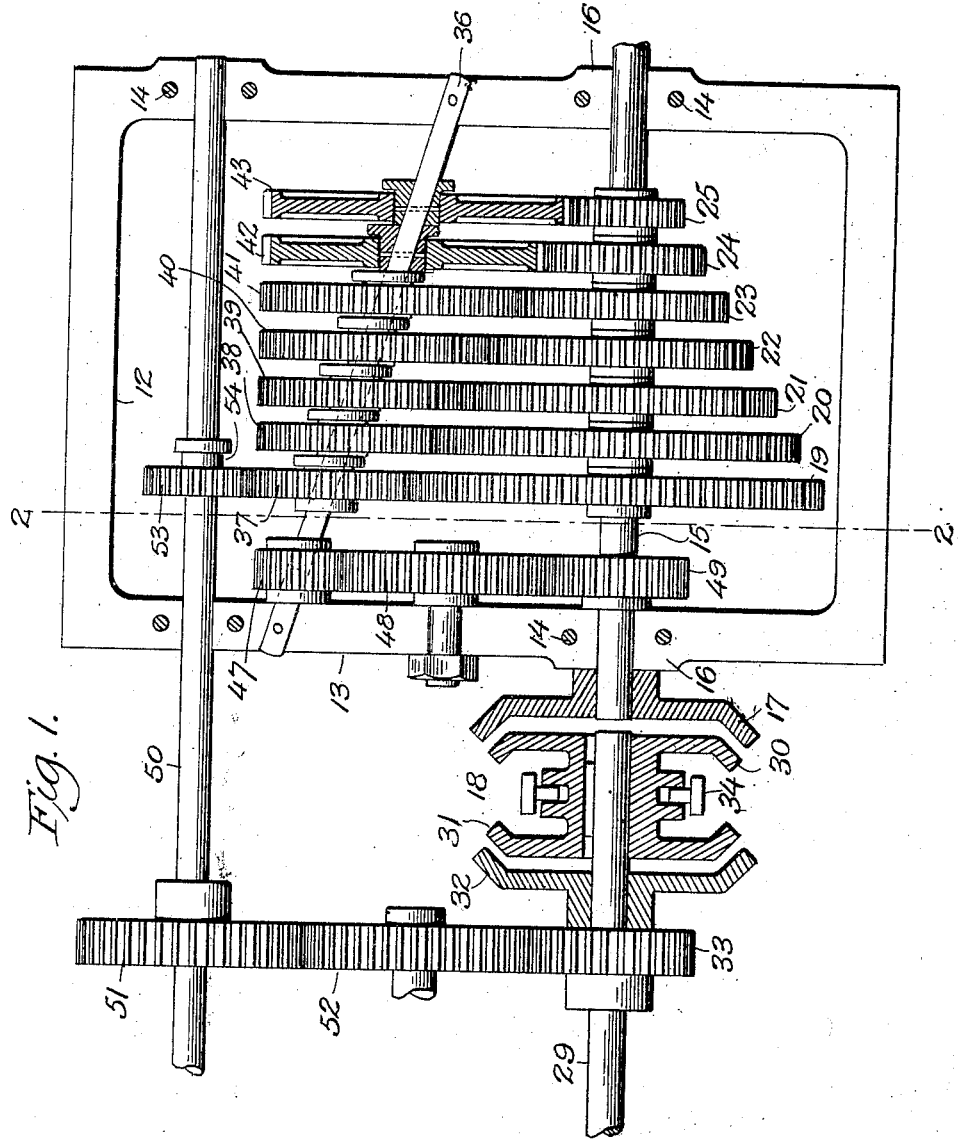
Fig. 1.
Dwight C. Slater,
Inventor
By
Attorney

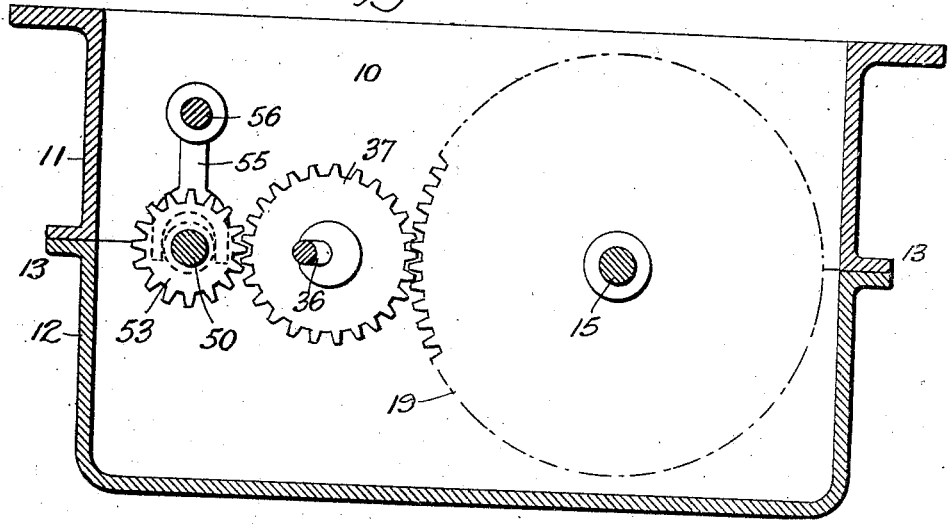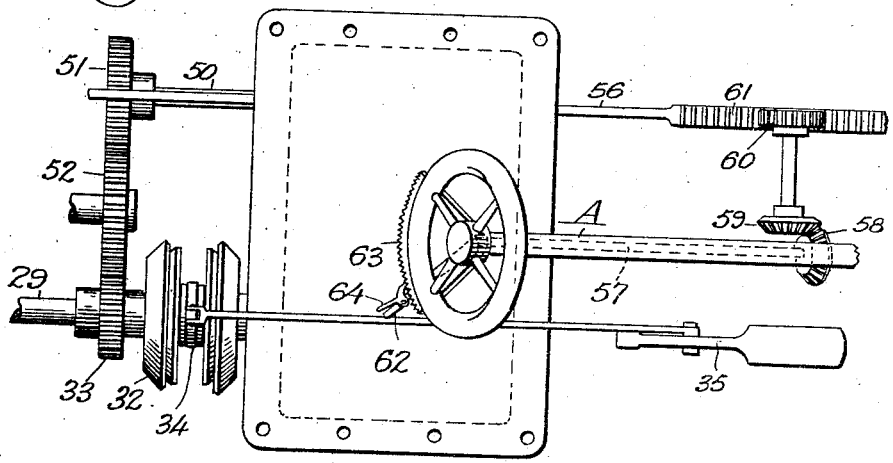

D. C. SLATER.
VARIABLE SPEED TRANSMISSION MECHANISM.
APPLICATION FILED SEPT 9, 1920.

1,383,159.

Patented June 28, 1921.
3 SHEETS—SHEET 3.

Dwight C. Slater
Inventor

By
Attorney

UNITED STATES PATENT OFFICE.

DWIGHT C. SLATER, OF ESSEX JUNCTION, VERMONT.

VARIABLE-SPEED-TRANSMISSION MECHANISM.

1,383,159.   Specification of Letters Patent.   Patented June 28, 1921.

Application filed September 9, 1920. Serial No. 409,151.

*To all whom it may concern:*

Be it known that I, DWIGHT C. SLATER, a citizen of the United States, residing at Essex Junction, in the county of Chittenden and State of Vermont, have invented certain new and useful Improvements in Variable-Speed-Transmission Mechanism, of which the following is a specification.

This invention relates to transmission gearing designed for application to automobiles, counter-shafts, machine tools and other kinds of mechanism where a variable speed in one direction is desired between the driving and driven shafts and also where a reverse rotation of the driven shaft is required.

One of the primary objects of the invention is to provide in a simple, compact form variable speed transmission gearing comprising groups of coöperating gear wheels of different diameters, an element of each group being mounted on the driven shaft to rotate the same in engagement with a second element, the latter elements being rotatable in the same planes as the first elements on a shaft fixed at such an angle to the driving shaft that the peripheries of the second elements on the sides opposite the first elements will lie in a plane parallel to the axis of the driven shaft. A pinion mounted on a shaft parallel to the driven shaft and to the plane sides of the gear elements and rotated by gearing from the driving shaft, is rotatably fixed on said shaft but permitted to slide longitudinally thereon to engage any of said groups of coöperating gear wheels for imparting the desired speed of rotation to the driven shaft.

Another object of the invention is to provide a novel means for mounting the gear wheel elements on the inclined shaft in such manner that they will rotate in planes parallel to one another but at an angle to the axis of the shaft.

A further object of the invention is directed to a clutch mechanism on the driving shaft by means of which the driving shaft may be coupled directly to the driven shaft, to the variable speed gearing, or disconnected from both when the driven shaft is to remain at rest.

Other features of the invention will be disclosed in the description following and illustrated in the accompanying drawings forming a part of this specification, in which—

Figure 1 is an elevation of the improved transmission gearing with one side of the gear casing removed.

Fig. 2 is a vertical sectional view on the line 2—2 of Fig. 1.

Fig. 3 is a top plan view of the shifting device for varying the speed of the mechanism.

Figure 4:
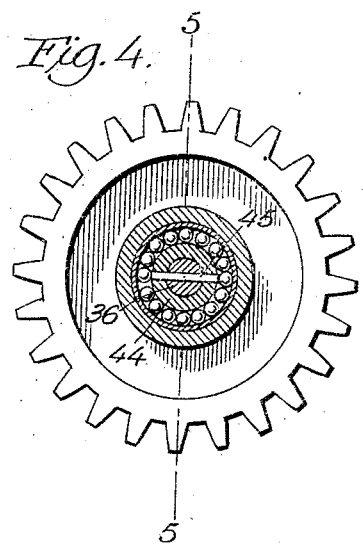
Fig. 4 is a detail sectional view on the line 4—4 of Fig. 1, showing the mounting of the gear wheels on the inclined shaft.
Figure 5:
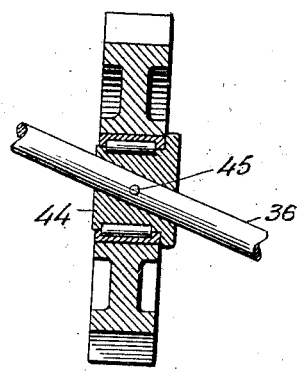
Fig. 5 is a sectional view on the line 5—5 of Fig. 4.
Figure 6:
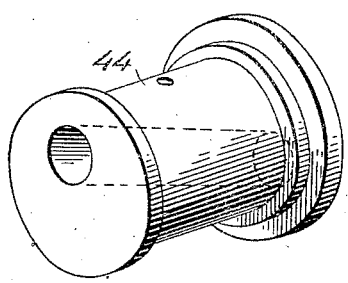
Fig. 6 is a perspective view of the gear wheel bearing carried on the inclined shaft.

In the drawings 10 indicates a gear casing of any approved size and shape, but here represented somewhat in the form of a box wider at the bottom than at the top and divided centrally into two similar parts 11 and 12, the abutting edges of which are provided with flanges 13 for fastening bolts or screws 14.

Across the center of the casing 10 near the bottom is a shaft 15 journaled in bearings 16 formed on the flanged abutting edges of the casing members 11 and 12. The shaft 15, to be called the driven shaft, projects at its ends beyond the casing 10, on one of which ends is fixed close to the casing, one member 17 of a clutch 18. The other end of the shaft is of indefinite length and designed to carry some means for conveying the motion of the shaft to the mechanism driven.

Within the casing 10 and mounted on the driven shaft 15, are a plurality of gear wheels 19, 20, 21, 22, 23, 24 and 25, decreasing regularly in size from the gear wheel 19.

Figure 7:
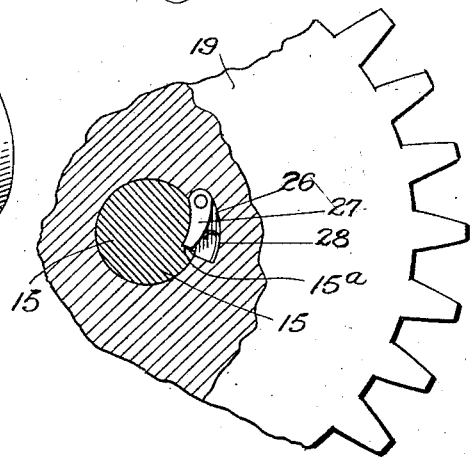
Fig. 7 is a detail view of the ratchet connection between the driven shaft and the gear wheels thereon.

In the hub of each gear wheel is a pocket 26 for a ratchet tooth 27 pivoted to the hub and held at its free end by a spring 28 in engagement with a shouldered notch 15$^a$ formed in the side of the shaft 15. By this construction, forward rotation in the direction of the arrow, Fig. 7, of any one of the gear wheels 19 to 25 will cause like rotation of shaft 15. The shaft 15 can also be rotated forwardly independently of the gear wheels when desired by means now to be described.

Without the gear casing 10 and axially in line with the driven shaft 15, is a shaft 29 rotated by an engine or other source of power, not shown. The ends of shafts 15 and 29 are in close relation, the latter shaft supporting the sliding member of clutch 18 which has a conical head 30 movable into engagement with the clutch member 17 on shaft 15. A similar head 31 on the opposite end of the clutch is engageable with a clutch member 32 turning freely on the main driving shaft 29, said clutch member being fixed to a pinion 33 rotating the latter. A yoke 34 of well known construction and operated by a foot or hand lever 35 serves to shift the sliding member of the clutch 18 optionally into engagement with clutch member 17 or 32. When clutch head 30 and clutch member 17 are engaged, the shaft 15 is driven directly from the main power shaft 29 and at the same speed as said shaft.

Fixed within the casing 10 is an inclined shaft 36 which carries the intermediate gears 37, 38, 39, 40, 41, 42 and 43, which are of progressively increasing diameters and which mesh respectively with the gears 19—25. In order that the gears 37—43 may be properly mounted on the inclined shaft so as to rotate in alinement with the respective gears 19—25, I provide a mounting which is formed as a spool-like member or flanged bushing 44 rigidly secured to the shaft 34 as by a transverse pin 45. Each bushing has an inclined bore through which the shaft 34 is passed so that they will be in proper position. All the gears 37—43 are freely rotatable upon these bushings.

Secured upon the shaft 36 adjacent one end thereof, is a bushing 46 similar to the bushing 44 and carrying rotatable thereon a gear 47 meshing with an intermediate gear 48 journaled upon the adjacent end of the casing and meshing with a gear 49 secured upon the shaft 15. This constitutes the reverse gear mechanism.

Journaled through the upper part of the casing 10 is a shaft 50 which carries upon one end a gear 51 meshing with an intermediate gear 52 which in turn meshes with the pinion 33. Splined upon the shaft 50 is a slidable pinion 53 adapted to mesh with any of the gears 37—43 or the gear 47 and carrying a grooved collar 54. Engaging the collar 54 is a shifting fork 55 secured upon a rod 56 slidable through the casing 10.

In order to effect shifting of the pinion 53, I provide a shaft 57 journaled along the steering post A of the vehicle and carrying at one end a bevel gear 58 meshing with a bevel gear 59 carrying spur teeth 60 meshing with rack teeth 61 on the rod or bar 56.

At its other end the shaft 57 carries a handle 62 movable over a notched segment 63 and having a spring-pressed latch 64 engageable within the notches.

In the operation of the device, the shaft 29 is rotating constantly while the engine (not shown) is in operation. When a direct drive is desired the operator moves the pedal 35 to shift the clutch 18 so that the face 30 thereof will engage the clutch element 17. The shaft 15 will then be driven directly by and at the same speed as the engine shaft 29. All the gears 37—43 will be rotating, but idly, and the shaft 50 will be idle.

When it is desired to drive at other than engine shaft speed, the operator first throws the clutch member 18 into neutral position and then moves the handle 62 to bring the latch 64 into the desired notch on the segment 63 whereupon the gearing on the shaft 57 will operate to shift the rod 56 longitudinally to bring the pinion 53 into mesh with either desired one of the gears 37—43. The pedal 35 is then moved to shift the clutch member 18 to bring the face 31 thereof into engagement with the clutch member 32. The shaft 50 will then be rotated and the pinion 53 will drive whichever gear 37—43 with which it meshes and this intermediate gear will drive whichever one of the gears 19—25 with which it meshes and the shaft 15 will consequently be rotated at a speed depending upon the ratio of the intermeshing intermediate and final gears. By properly manipulating the handle 63 and throwing the clutch 18 in or out when necessary, a large number of shifts may be made to change the speed to suit different conditions.

When it is desired to go into reverse, the handle 63 is so moved as to shift the rod 56 to move the pinion 53 into mesh with the gear 47 whereupon the shaft 15 will be driven through the gears 53, 47, 48 and 49 in the reverse direction. The provision of the pawls 27 in the hubs of the gears 19—25 permits this reverse rotation of the shaft 15.

From the foregoing description and a study of the drawings it is apparent that I have thus provided a simply constructed and easily operated transmission mechanism which provides a wide variety of speed changes effected simply by movement of a handle carried at the steering post in very convenient position to be reached.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In a variable speed transmission, the combination with a drive and a driven shaft, of a plurality of gears secured upon the driven shaft and of progressively decreasing diameters, an inclined stationary shaft, a plurality of gears carried by said inclined shaft and of progressively increasing diameter and meshing with said first named gears, means for mounting said second named gears upon said inclined shaft for free rotation thereon in the same planes as the first named gears, and means operated by said drive shaft for applying power to a selected one of said second named gears.

2. In a variable speed transmission, the combination with a drive and a driven shaft, of a plurality of gears secured upon the driven shaft and of progressively decreasing diameters, an inclined stationary shaft, a plurality of gears carried by said inclined shaft and of progressively increasing diameter and meshing with said first named gears, means for mounting said second named gears upon said inclined shaft for free rotation thereon in the same planes as the first named gears, and means operated by said drive shaft for applying power to a selected one of said second named gears, said means comprising a shaft, a pinion slidable on said shaft and movable into mesh with any one of said second named gears, and a releasable connection between said last named shaft and the drive shaft.

3. In a variable speed transmission, the combination with a drive and a driven shaft, of a plurality of gears secured upon the driven shaft and of progressively decreasing diameters, an inclined stationary shaft, a plurality of gears carried by said inclined shaft and of progressively increasing diameters and meshing with said first named gears, means for mounting said second named gears upon said inclined shaft for free rotation thereon in the same planes as the first named gears, and means operated by said drive shaft for applying power to a selected one of said second named gears, said means comprising a shaft, a pinion slidable thereon and adapted to be meshed with a desired one of said second named gears, a clutch member rotatable upon the drive shaft and having drive connection with said last named shaft, a slidable clutch element rotating with the drive shaft and engageable with said first named clutch element, and a clutch member carried by the driven shaft and adapted to be engaged by said second named clutch element.

4. In a variable speed transmission, including a plurality of gears mounted upon a driven shaft, and a plurality of intermediate gears meshing with said first named gears, means for driving a selected one of said intermediate gears comprising a rotating shaft, a pinion slidable and nonrotatable upon said last named shaft and carrying a grooved collar, a rod connected with said collar and formed with rack teeth, a manually rotatable shaft having gear connection with said rack teeth, a handle on said last named shaft carrying latch means, and a segment traveled over by said handle and notched to correspond with the number of said intermediate gears.

In testimony whereof I affix my signature.

DWIGHT C. SLATER.